(12) United States Patent
Hoff

(10) Patent No.: US 11,846,344 B1
(45) Date of Patent: Dec. 19, 2023

(54) TORQUE CONVERTER HAVING FLOATING HUB

(71) Applicant: Schaeffler Technologies AG & Co. KG, Herzogenaurach (DE)

(72) Inventor: Austin Hoff, New Franklin, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/940,161

(22) Filed: Sep. 8, 2022

Related U.S. Application Data

(60) Provisional application No. 63/359,274, filed on Jul. 8, 2022.

(51) Int. Cl.
*F16H 45/02* (2006.01)

(52) U.S. Cl.
CPC .................... *F16H 45/02* (2013.01)

(58) Field of Classification Search
CPC ............. F16D 45/02–2045/0294; F16D 33/18
See application file for complete search history.

(56) References Cited

U.S. PATENT DOCUMENTS

| | | | |
|---|---|---|---|
| 11,047,461 B2 | 6/2021 | Wirachowski et al. | |
| 2007/0144161 A1* | 6/2007 | Marathe | F16H 41/24 60/330 |
| 2008/0121485 A1* | 5/2008 | Degler | F16H 45/02 192/3.29 |
| 2008/0156129 A1* | 7/2008 | Degler | F16H 45/02 74/411 |
| 2011/0114433 A1* | 5/2011 | Hattori | F16H 45/02 192/3.29 |
| 2013/0056319 A1* | 3/2013 | Lindemann | F16H 45/02 60/330 |
| 2017/0363193 A1* | 12/2017 | Jeon | F16H 45/02 |
| 2020/0032790 A1* | 1/2020 | Garner | F04C 15/0038 |
| 2021/0079989 A1* | 3/2021 | Jewell | F16H 45/02 |

FOREIGN PATENT DOCUMENTS

| | | | | |
|---|---|---|---|---|
| KR | 101858186 B1 * | 5/2018 | ............ | F16H 45/02 |
| KR | 101858186 B1 * | 5/2018 | ............ | F16H 45/02 |

* cited by examiner

*Primary Examiner* — Ernesto A Suarez
*Assistant Examiner* — Lillian T Nguyen

(57) ABSTRACT

A torque converter is provided that includes a front cover arranged to receive a torque, an impeller having an impeller shell non-rotatably connected to the cover, and a turbine in fluid communication with the impeller and including a turbine shell. An output element is disposed axially between the front cover and the turbine shell and arranged to connect to a transmission input shaft. The output element includes a flange and a neck extending axially from the flange towards the front cover. A lock-up clutch includes a piston. A floating hub is disposed axially between the front cover and the flange and is sealed to the piston and the transmission input shaft. The floating hub is non-rotatably connected to the neck of the output element.

20 Claims, 2 Drawing Sheets

TORQUE CONVERTER HAVING FLOATING HUB

CROSS-REFERENCE TO RELATED APPLICATIONS

This application claims the benefit of U.S. Provisional Patent Application No. 63/359,274, filed Jul. 8, 2022, the disclosure of which is incorporated in its entirety by reference herein.

TECHNICAL FIELD

The present disclosure relates generally to torque converters and more specifically to torque converters having a floating hub.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, most torque converters include a bypass or lock-up clutch that mechanically couples the turbine shaft to a case of the torque converter to bypass the fluid coupling. Torque converters may include lock-up clutch assembly having a hub and a seal plate sealed to the hub and supporting a piston. The hub is typically fixed to a transmission input shaft and configured to center the seal plate on the transmission input shaft. However, these lock-up clutch assemblies may be expensive and add complexity to a torque converter design.

SUMMARY

Embodiments disclosed herein provide a torque converter including a front cover arranged to receive a torque, an impeller having an impeller shell non-rotatably connected to the cover, and a turbine in fluid communication with the impeller and including a turbine shell. The torque converter further includes an output element disposed axially between the front cover and the turbine shell and arranged to connect to a transmission input shaft. The output element includes a flange and a neck extending axially from the flange towards the front cover. The torque converter further includes a lock-up clutch including a piston. The torque converter further includes a floating hub disposed axially between the front cover and the flange and sealed to the piston and the transmission input shaft. The floating hub is non-rotatably connected to the neck of the output element.

In embodiments, the floating hub may be axially moveable relative to the neck. In embodiments, the piston may be sealed to the floating hub at an inner diameter of the piston.

In embodiments, the neck may include an extension axially spaced from the flange and extending radially outward from the neck. The floating hub may include a first extension having an end configured to abut the extension. The first extension may be configured to pilot the floating hub via the neck. The floating hub may include a second extension extending axially farther than the first extension. The second extension may be configured to rotationally engage the extension. The second extension may extend radially outside of the first extension. The neck may include a further extension circumferentially spaced from the extension. The second extension may be disposed circumferentially between the extension and the further extension.

In embodiments, the torque converter may include a thrust washer axially disposed between the front cover and the floating hub. The thrust washer may be configured to transfer thrust forces between the floating hub and the front cover. In embodiments, the torque converter may include a first seal configured to seal an outer diameter of the floating hub to the piston and a second seal configured to seal an inner diameter of the floating hub to the transmission input shaft. The second seal may be a static seal.

In embodiments, the piston may be configured to slide axially along the floating hub to close the lock-up clutch. In embodiments, the floating hub may include a body having a hole extending radially therethrough.

Embodiments disclosed herein further provide a floating hub for a torque converter. The floating hub includes a body, a first extension, and a second extension. The body is configured to be sealed at an inner diameter to a transmission input shaft and sealed at an outer diameter to a piston of a lock-up clutch. The first extension extends axially from the body and is configured to engage an output element. The second extension extends axially from the body and is configured to non-rotatably connect the floating hub to the output element.

In embodiments, the second extension may extend radially outside of the first extension. In embodiments, an end of the first extension may be disposed between the body and an end of the second extension. In embodiments, an end of the first extension may be configured to abut a thrust surface of the output element. In embodiments, the first extension may be configured to pilot the floating hub via the output element. In embodiments, the second extension may radially overlaps the first extension. In embodiments, the body may include a hole extending radially therethrough.

Embodiments disclosed herein provide the advantageous benefit of reduced costs and complexity of torque converters, for example, by removing a hub that is typically fixed to a transmission input shaft and used to center a seal plate. Furthermore, embodiments disclosed herein offer design advantages by creating a lock-up clutch assembly without any forging operations.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
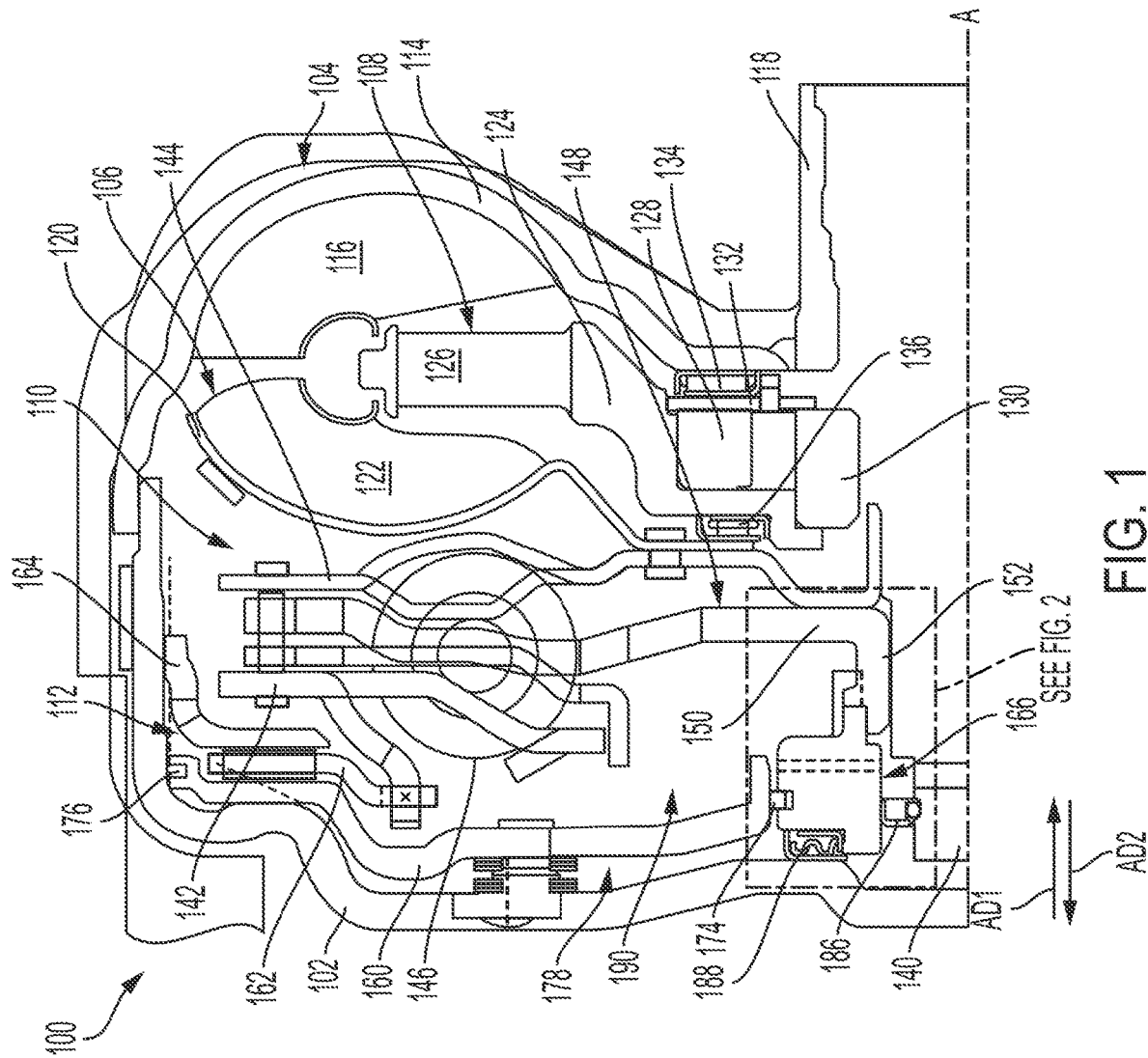
FIG. 1 is a cross-sectional view of a torque converter having a floating hub according to an embodiment of the present disclosure.
Figure 2:
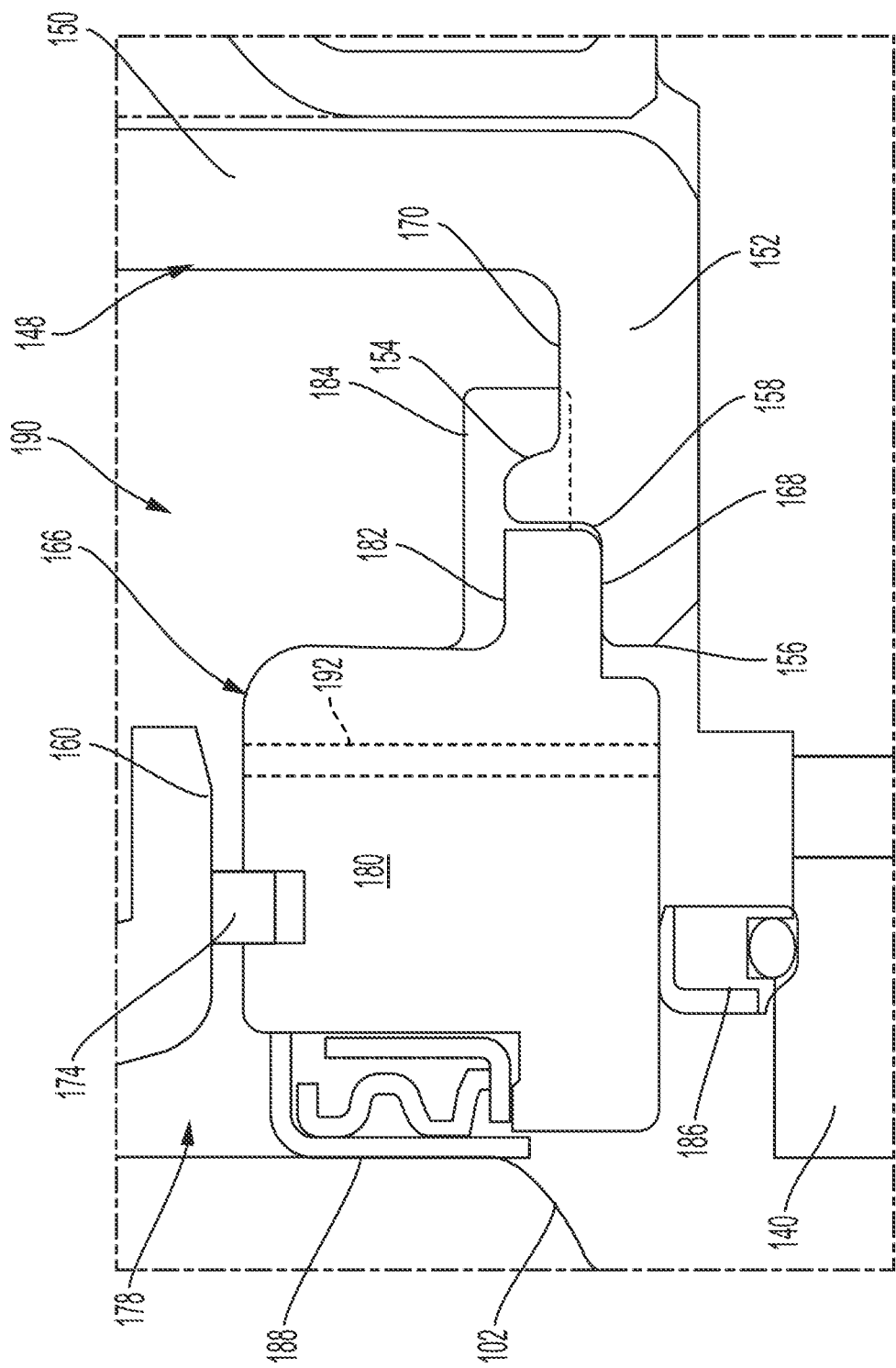
FIG. 2 is an enlarged view of an area of the torque converter shown in FIG. 1 showing the floating hub.

Referring to FIGS. 1-2, a portion of a torque converter 100 is illustrated according to one embodiment of the present disclosure. At least some portions of the torque converter 100 are rotatable about a central axis A. While only a portion of the torque converter 100 above the central axis A is shown in FIG. 1, it should be understood that the torque converter 100 can appear substantially similar below the central axis A with many components extending about the central axis A. Words such as "axial," "radial," "circumferential," "outward," etc. as used herein are intended to be with respect to the central axis A.

The torque converter 100 includes: a front cover 102 arranged to receive torque; an impeller assembly 104; a turbine assembly 106; a damper assembly 110; and a lock-up clutch assembly 112. The impeller assembly 104 includes: an impeller shell 114 non-rotatably connected to the front cover 102; at least one impeller blade 116 attached to an inner surface of the impeller shell 114; and an impeller hub 118 fixed to a radially inner end of the impeller shell 114. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

The turbine assembly 106 includes: a turbine shell 120; and at least one turbine blade 122 attached to the turbine shell 120. The torque converter 100 may include a stator assembly 108 disposed axially between the turbine assembly 106 and the impeller assembly 104 to redirect fluid flowing from the turbine blade 122 before the fluid reaches the impeller assembly 104 to increase the efficiency of torque converter 100. For example, the impeller blade 116, when rotated about the central axis A, pushes fluid outwardly. The fluid pushes against the turbine assembly 106, causing the turbine assembly 106 to revolve about the central axis A. The stator assembly 108 functions to return the fluid from the turbine assembly 106 back to the impeller assembly 104 with minimal or no power loss.

Stator assembly 108 may further include: a stator body 124; at least one stator blade 126 attached thereto; a one-way clutch 128; and a stator hub 130. A side plate 132 may be provided axially between the stator assembly 108 and the impeller assembly 104 and may be configured to retain or hold the one-way clutch 128 within the stator body 124. An axial thrust washer 134 may be provided axially between the stator assembly 108 and the impeller assembly 104 and may be attached to an outer circumference of the side plate 132. An axial thrust washer 136 may further be provided axially between a radially extending inner portion of the turbine shell 120 and the stator assembly 108.

The damper assembly 110 is positioned axially between the front cover 102 and the turbine assembly 106 and is configured for transferring torque from the front cover 102 to a transmission input shaft 140. The damper assembly 110 may include: springs 146; a cover plate 142; a cover plate 144; and an output element 148. The cover plate 142 may support the springs 146 on one axial side. The cover plate 144 may support the springs 146 on another, opposite axial side. The cover plates 142, 144 may be connected, for example, via a rivet radially outside the springs 146. The cover plate 142 may be connected to the lock-up clutch assembly 112, and the cover plate 144 may be connected to the turbine shell 120. That is, the cover plates 142, 144 are arranged to act as an input to the damper assembly 110.

The output element 148 is connected to the transmission input shaft 140 for torque transmission therebetween. The output element 148 includes a flange 150 and a neck 152 extending axially from the flange 150 towards the front cover 102. The neck 152 includes an end 156 axially spaced from the flange 150. The neck 152 includes an extension 154 disposed axially between the flange 150 and the end 156. The extension 154 extends radially outwardly from the neck 152 and partially circumferentially about the central axis A. The extension 154 includes a thrust surface 158 facing the front cover 102. The thrust surface 158 may extend in a plane substantially perpendicular to the central axis A. By "substantially perpendicular," we mean that the plane extends radially outwardly from the neck 152, even if the plane may deviate from perpendicular to the central axis A, e.g., to due manufacturing tolerances and/or capabilities. The neck 152 may include a plurality of extensions 154 circumferentially spaced from each other about the central axis A.

The neck 152 may include a first portion 168 and a second portion 170. The first portion 168 may be arranged axially between the extension 154 and the end 156. The first portion 168 may extend circumferentially along the extension 154. That is, the neck 152 may include a plurality of first portions 168 circumferentially aligned with respective extensions 154 The second portion 170 may extend axially from the extension 154 to the flange 150 of the output element 148 and circumferentially about the central axis A. Additionally, neck 152 may include a plurality of channels (not numbered) circumferentially spaced from each other. Each channel may be arranged between the circumferentially adjacent extensions 154. An outer surface of the second portion 170 is arranged radially outside of an outer surface of the first portion 168.

The lock-up clutch assembly 112 is configured to selectively transfer torque from the front cover 102 to the transmission input shaft 140 and includes: a piston 160; a clutch plate 162; a reaction plate 164, and a floating hub 166. The reaction plate 164 may be fixed to the front cover 102 via a weld, for example. The clutch plate 162 is disposed between the reaction plate 164 and the piston 160 and connected to the cover plate 142 of the damper assembly 110, e.g., via a tabbed connection. The piston 160 may be disposed axially between the front cover 102 and the clutch plate 162 and configured to be sealed to the front cover 102 at an outer end thereof via seal 176 and sealed to the floating hub 166 at an inner end thereof via seal 174. The piston 160 may further be connected to the front cover 102 via a leaf-spring connection that allows axial displacement of the piston 160 in a first axial direction AD1 and a second axial direction AD2 for selective engagement of the lock-up clutch assembly 112.

During axial movement of the piston 160, the piston 160 slides along the floating hub 166. The piston 160 closes the lock-up clutch assembly 112 in response to pressurization of a medium (e.g., fluid such as oil) in a piston apply chamber 178 defined between the front cover 102 and the piston 160. Seals 174, 176 maintain a fluid separation between the piston apply chamber 178 and a piston release chamber 190. The piston apply chamber 178 is further defined by, or bounded between, the front cover 102, the floating hub 166, the seal 174, the piston 160, and the seal 176. The piston release chamber 190 is further defined by, or bounded between, the turbine shell 120, the floating hub 166, the seal 174, the piston 160, the seal 176, and the front cover 102. By "bounded in part," we mean that a portion of the cited chamber, flow path, or other structure is bounded, or formed, by the cited element.

The torque converter 100 may include grooves (not shown) arranged on at least one of the front cover 102 or the floating hub 166. The grooves may extend radially into the piston apply chamber 178. The grooves may be provided to allow fluid flow between piston apply chamber 178 and the transmission input shaft 140. That is, pressurized fluid may be supplied from the transmission input shaft 140 and then routed between the front cover 102 and the floating hub 166 via grooves to the piston apply chamber 178.

The floating hub 166 is disposed between the front cover 102 and the flange 150. As one example, the floating hub 166 may be a cast metal, e.g., aluminum. As another example, the floating hub 166 may be a powder metal. That is, the floating hub 166 may be formed by compressing and sintering metal power to achieve a desired shape. In this way, the floating hub 166 reduces costs and complexity associated with typical forged floating hubs.

The floating hub 166 is sealed to the piston 160 at an outer diameter of the floating hub 166 via the seal 174. The floating hub 166 is sealed to the transmission input shaft 140 at an inner diameter of the floating hub 166 via a seal 186. An axial thrust bearing 188 is further provided axially between the front cover 102 and the floating hub 166, which transfers thrust forces from the floating hub 166 to the front cover 102.

The floating hub 166 includes a body 180, a first extension 182, and second extensions 184. The first and second extensions 182, 184 extend axially from the body 180 towards the turbine assembly 106. The first extension 182 is circumferentially aligned with the extension 154. The first extension 182, e.g., an inner surface thereof, is configured to engage the outer surface of the first portion 168. Specifically, the outer surface of the first portion 168 centers the floating hub 166 on the transmission input shaft 140. That is, the first portion 168 is configured to pilot the floating hub 166 relative to the transmission input shaft 140. Additionally, an end of the first extension 182 may be configured to abut the thrust surface 158 of the extension 154 such that the extension 154 and first extension 182 can transfer thrust forces between the output element 148 and the floating hub 166. The floating hub 166 may include a same number of first extensions 182 as a number of extensions 154.

The second extensions 184 are circumferentially spaced from each other. Each second extension 184 may extend farther along the central axis A than the first extension 182. For example, an end of each second extension 184 may be disposed axially between the extension 154 and the flange 150 of the output element 148. Each second extension 184 may radially overlap one respective first extension 182. The second extensions 184 are configured to rotationally engage the extensions 154, e.g., each second extension 184 may be circumferentially disposed between circumferentially adjacent extensions 154. For example, the second extensions 184 are arranged to be circumferentially constrained by the extensions 154, e.g., each second extension 184 may be received in one respective channel of the neck 152, such that the floating hub 166 rotates when the neck 152 rotates.

The floating hub 166 may include one or more holes 192 extending radially through the body 180. The holes 192 may be disposed circumferentially between the second extensions 184. Each first extension 182 may extend partially about the central axis A from one hole 192 to another hole 192. The holes 192 may be provided to allow fluid flow between piston release chamber 190 and the transmission input shaft 140. That is, pressurized fluid may be supplied from the transmission input shaft 140 and then routed through the holes 192 in the body 180 of the floating hub 166 to the piston release chamber 190.

The floating hub 166 may be indirectly connected to the transmission input shaft 140, e.g., via the output element 148, such that the floating hub 166 may be axially moveable relative to the neck 152, the front cover 102, and the transmission input shaft 140. For example, an axial distance from the front cover 102 to the thrust surface 158 may be greater than an axial width of the axial thrust bearing 188 and an axial width of the floating hub 166 determined from an axial side of the floating hub 166 engaged with the axial thrust bearing 188 to the end of the first extension 182. In such an example, the floating hub 166 may axially move relative to the transmission input shaft 140.

By non-rotatably connecting the floating hub 166 to the neck 152, the seal 186 can be configured as a static seal, which can reduce costs and maintenance associated with typical dynamic seals. Additionally, non-rotatably connecting the floating hub 166 to the neck 152 allows for minimizing an area of the thrust surface 158 for transferring thrust forces between the output element 148 and the front cover 102.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 torque converter
102 front cover
104 impeller assembly
106 turbine assembly
108 stator assembly
110 damper assembly
112 lock-up clutch assembly
114 impeller shell
116 one impeller blade
118 impeller hub
120 turbine shell 122 one turbine blade
124 stator body
126 one stator blade
128 one-way clutch
130 stator hub
132 side plate
134 washer
136 washer
140 transmission input shaft
142 cover plate
144 cover plate
146 springs
148 output element
150 flange
152 neck
154 extension
156 end
158 thrust surface
160 piston
162 clutch plate
164 reaction plate
166 floating hub
168 first portion
170 second portion
174 seal
176 seal
178 piston apply chamber
180 body
182 first extension
184 second extension
186 seal
188 bearing
190 piston release chamber
192 hole
A central axis
AD1 first axial direction
AD2 second axial direction

What is claimed is:

1. A torque converter, comprising:
a front cover arranged to receive a torque;
an impeller having an impeller shell non-rotatably connected to the cover;
a turbine in fluid communication with the impeller and including a turbine shell;
an output element disposed axially between the front cover and the turbine shell and arranged to connect to a transmission input shaft, the output element including a flange and a neck extending axially from the flange towards the front cover;
a lock-up clutch including a piston; and
a floating hub disposed axially between the front cover and the flange and sealed to the piston and the transmission input shaft, the floating hub being non-rotatably connected to the neck of the output element;
wherein the neck includes an extension axially spaced from the flange and extending radially outward from the neck;
wherein the floating hub includes a first extension having an end configured to abut the extension.

2. The torque converter according to claim 1, wherein the floating hub is axially moveable relative to the neck.

3. The torque converter according to claim 1, wherein the piston is sealed to the floating hub at an inner diameter of the piston.

4. The torque converter according to claim 1, wherein the first extension is configured to pilot the floating hub via the neck.

5. The torque converter according to claim 1, wherein the floating hub includes a second extension extending axially farther than the first extension, the second extension being configured to rotationally engage the extension.

6. The torque converter according to claim 5, wherein the second extension extends radially outside of the first extension.

7. The torque converter according to claim 5, wherein the neck includes a further extension circumferentially spaced from the extension, the second extension being disposed circumferentially between the extension and the further extension.

8. The torque converter according to claim 1, further comprising a thrust washer axially disposed between the front cover and the floating hub, the thrust washer being configured to transfer thrust forces between the floating hub and the front cover.

9. The torque converter according to claim 1, further comprising a first seal configured to seal an outer diameter of the floating hub to the piston and a second seal configured to seal an inner diameter of the floating hub to the transmission input shaft.

10. The torque converter according to claim 9, wherein the second seal is a static seal.

11. The torque converter according to claim 1, wherein the piston is configured to slide axially along the floating hub to close the lock-up clutch.

12. The torque converter according to claim 1, wherein the floating hub includes a body having a hole extending radially therethrough.

13. A floating hub for a torque converter, comprising:
a body configured to be sealed at an inner diameter to a transmission input shaft and sealed at an outer diameter to a piston of a lock-up clutch;
a first extension extending axially from the body and configured to engage an output element; and
a second extension extending axially from the body and configured to non-rotatably connect the floating hub to the output element, the second extension extending radially outside of the first extension;
wherein an end of the first extension is configured to abut a thrust surface of the output element.

14. The floating hub according to claim 13, wherein the end of the first extension is disposed between the body and an end of the second extension.

15. The floating hub according to claim 13, wherein the first extension is configured to pilot the floating hub via the output element.

16. The floating hub according to claim 13, wherein the second extension radially overlaps the first extension.

17. The floating hub according to claim 13, wherein the body includes a hole extending radially therethrough.

18. A floating hub for a torque converter, comprising:
a body configured to be sealed at an inner diameter to a transmission input shaft and sealed at an outer diameter to a piston of a lock-up clutch;
a first extension extending axially from the body and configured to engage a radial outer surface of a portion of an output element; and
a second extension extending axially from the body and configured to non-rotatably connect the floating hub to the output element.

19. The floating hub according to claim 18, wherein an end of the first extension is configured to abut a thrust surface of the output element.

20. The floating hub according to claim 18, wherein the second extension is configured to rotationally engage an extension of the output element radially outside of the radial outer surface of the portion of the output element.

* * * * *